Nov. 14, 1950   J. C. BREWER   2,529,481
FLUID RATE OF FLOW INDICATOR
Filed Oct. 7, 1947   3 Sheets-Sheet 2
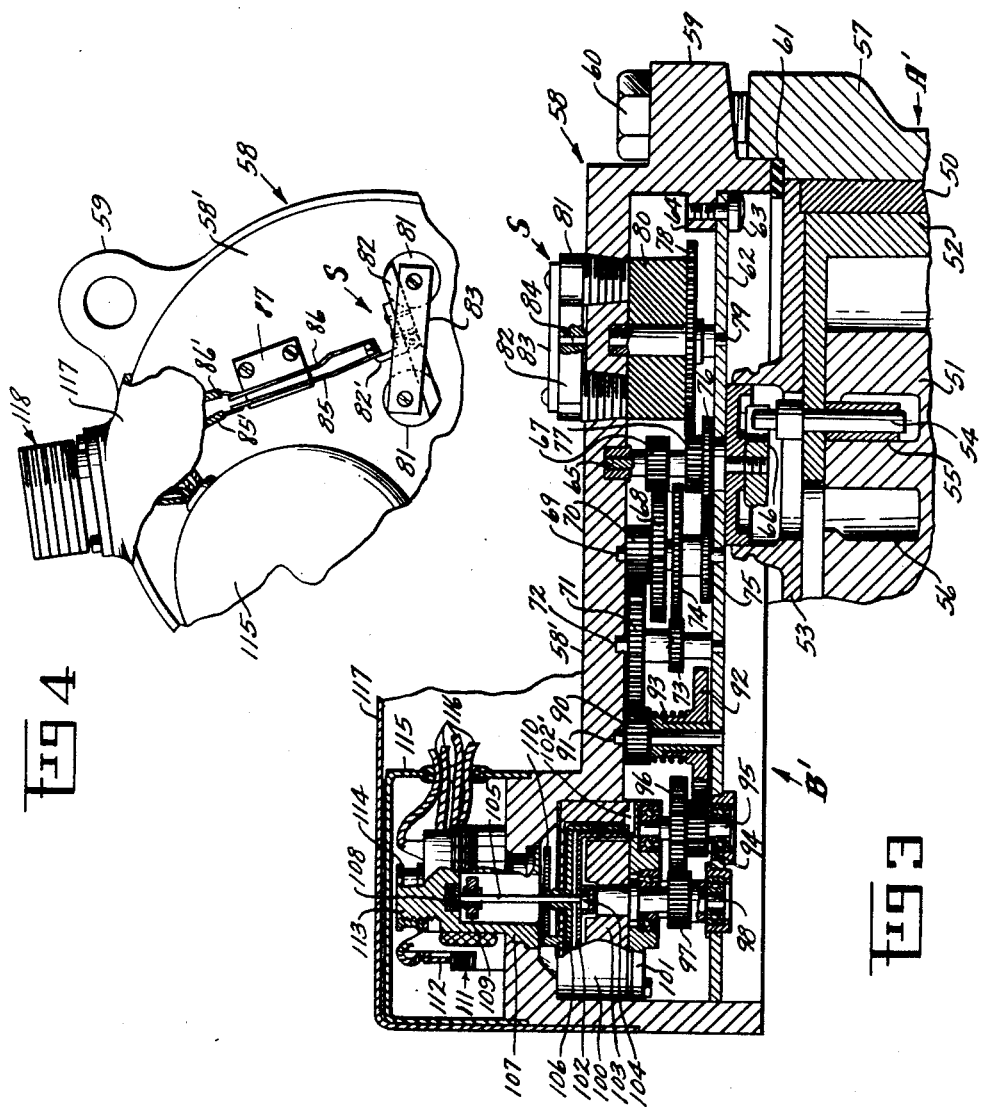
INVENTOR.
JAMES C. BREWER
BY Wade Koontz
ATTORNEY and
Charles L. Burgoyne.
AGENT Nov. 14, 1950  J. C. BREWER  2,529,481
FLUID RATE OF FLOW INDICATOR
Filed Oct. 7, 1947  3 Sheets-Sheet 3

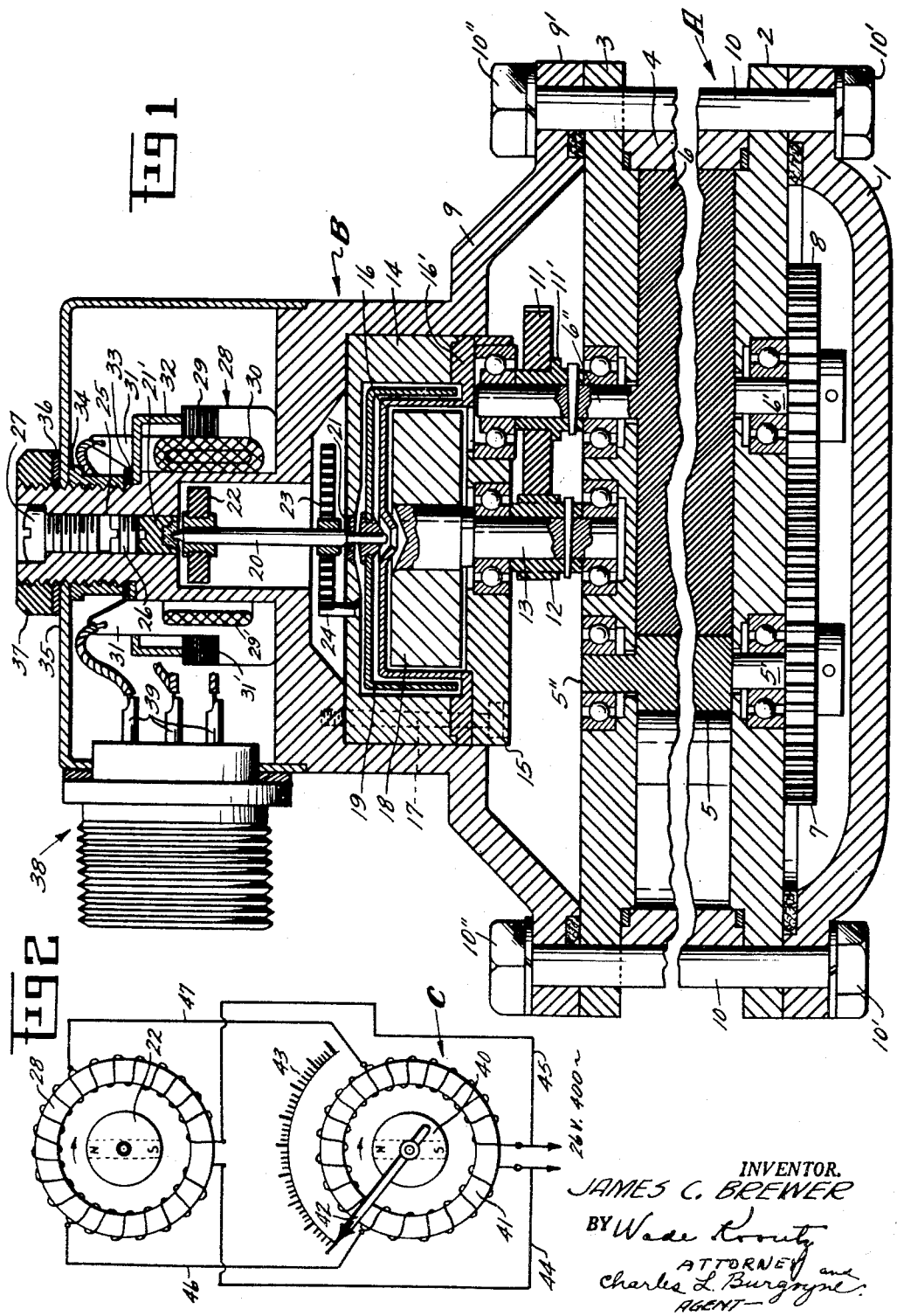

INVENTOR.
JAMES C. BREWER
BY Wade Koonty
ATTORNEY
Charles L. Burgoyne
AGENT

Patented Nov. 14, 1950

2,529,481

UNITED STATES PATENT OFFICE 2,529,481

FLUID RATE OF FLOW INDICATOR

James C. Brewer, Dayton, Ohio

Application October 7, 1947, Serial No. 778,448

8 Claims. (Cl. 73—231)

(Granted under the act of March 3, 1883, as amended April 30, 1928; 370 O. G. 757)

The invention described herein may be manufactured by or for the United States Government for governmental purposes without the payment to me of any royalty thereon.

The present invention relates to a fluid rate of flow indicator, and more particularly to a rate of flow transmitter which together with a remotely-located indicating instrument provides the complete rate of flow indicator.

The primary object of the invention is to provide a rate of flow indicator including a fluid flow actuated motor driving a rotating magnet within a cup-like non-magnetic shield to cause angular displacement of a metallic drag cup surrounding the shield, the angular displacement being adapted for measurement by means of a position indicating Magnesyn system having the transmitter rotor thereof mechanically coupled to the drag cup.

A further object of the invention is to provide a rate of flow indicator for measuring the rate of flow of liquids by the use of a rotatable metallic drag cup adapted to be displaced by a concentric magnet driven by a liquid current motor, wherein the drag cup and magnet are immersed in the liquid, and wherein the drag cup is isolated from the magnet by a stationary non-magnetic shield to prevent a variable viscosity drag on the drag cup due to the action of the adjacent concentric rotating magnet.

A further object of the invention is to provide a rate of flow indicator for measuring the rate of flow of liquids by the use of a liquid immersed drag cup which is displaced by a magnet driven by a liquid current motor, and wherein the relative displacement of the drag cup is indicated by a Magnesyn system having the field windings and electrical connections of the Magnesyn transmitter inaccessible to the liquid.

A related object of the invention is to provide a fluid rate of flow indicator including a fluid flow actuated impeller, a magnet directly driven by the impeller, a shield or shell mounted over the magnet, a drag cup rotatably mounted over the shield and directly connected to a Magnesyn transmitter rotor and wherein all of the foregoing elements are mounted concentrically within a fluid conduit.

Another object of the invention is to provide a fluid rate of flow indicator using a fluid flow actuated impeller and a directly coupled indicating system, resulting in an indicator which is not only quiet in operation but is not subject to excessive wear on any moving parts.

As is well known, the rate of flow of fuel on aircraft driven by jet motors, propeller jet motors and rocket motors is very high and may be subject to variation because of poor adjustment of the fuel feed system or for other reasons. Thus it is a further object of the invention to provide a reliable rate of fuel flow indicator for aircraft in an effort to maintain economical performance of the aircraft power plant.

Another object of the invention is to provide a fluid rate of flow indicator including a fluid flow actuated motor driving a fluid rate of flow transmitter device and also driving a fluid flow volume totalizing switch, the latter being adapted to produce impulses through an electric circuit to operate a counter device or totalizer.

Another object of the invention is to improve the structural reliability, compactness and indicating accuracy of fluid rate of flow indicators. Ancillary thereto it is an object of the invention to generally improve on and extend the field of usefulness of fluid rate of flow indicators.

The above and other objects of the invention will become apparent on reading the following detailed description in conjunction with the drawings in which:

Fig. 1 is a cross-sectional view of one form of the rate of fluid flow indicator, except for the indicating instrument located at some remote point. The fluid motor is cut away in transverse section to reduce the overall height of the view.

Fig. 2 is a schematic diagram of a Magnesyn transmitter and receiver as used in all forms of the invention.

Fig. 3 is a cross-sectional view of a second form of the rate of fluid flow indicator, except for the indicating instrument.

Fig. 4 is a top plan view of the indicator of Fig. 3 but with the main cover plate cut away to show the details of the volume totalizing switch.

Figure 5:
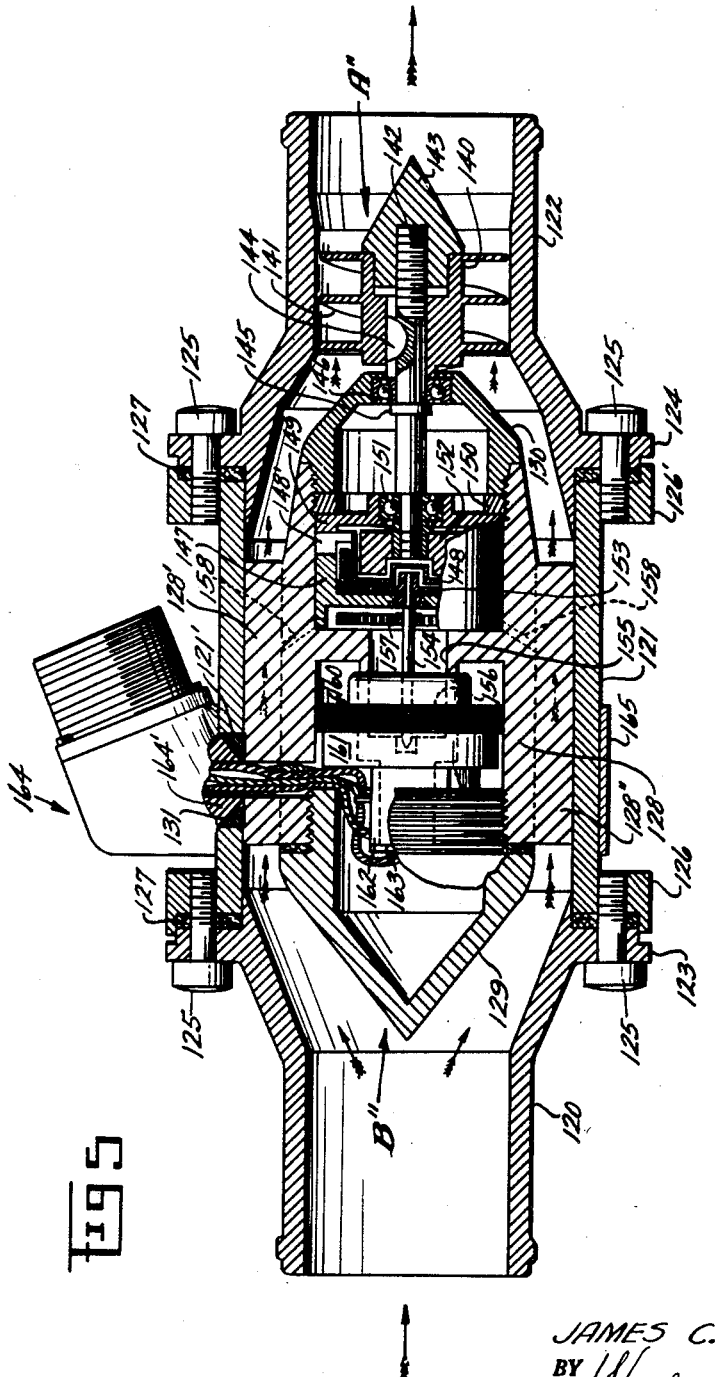
Fig. 5 is a cross-sectional view of a third form of the rate of fluid flow indicator, except for the indicating instrument.

The first form of the rate of fluid flow indicator to be described is shown in detail in Fig. 1, and the Magnesyn system which includes the flow indicating instrument is shown diagrammatically in Fig. 2. Referring to Figs. 1 and 2 the indicator comprises a fluid current motor A, an indicator unit or assembly B above the motor, and an indicator instrument C electrically connected to the indicator unit and forming the receiver of the Magnesyn system shown in Fig. 2.

The present rate of fluid flow indicator is primarily intended for measuring and giving a constant indication of the rate of flow of liquids, such as the liquid fuel used in aircraft operation. Other liquids or fluids may be used where desired and the present indicator will give accurate results over a wide range of flow rates. The particular fluid flow motor A of Fig. 1 is a positive displacement motor preferably of the Root's type having a pair of rotor members geared together in predetermined angular relation. The cross-sectional shape of these members may vary to some extent but a preferred construction is that of Example 2018, page 235, of "The Engineer's Sketch Book" (seventh edition, 1940) by Thomas Walter Barber. The motor unit A comprises a cover plate 1 and two parallel case plates 2 and 3 which form in conjunction with a cylindrical casing member 4 means to enclose the two rotor elements 5 and 6. The rotor 5 includes integral pivot portions 5' and 5" which extend through antifriction bearings secured in openings in the case plates 2 and 3. The lower pivot portion 5' of rotor 5 carries a gear wheel 7 in mesh with a similar gear wheel 8 carried on the lower pivot portion 6' of the rotor 6. Thus the two rotors are geared together to turn at the same speed. The cover plate 1, case plates 2 and 3 and the lower flange 9' of the indicator housing 9 are all apertured to receive the bolts 10 having heads 10' and nuts 10" thereon. The nuts 10" are tightened up to securely clamp the cylindrical casing member 4 between the two case plates 2 and 3. At diametrically opposite points the member 4 is apertured to provide inlet and outlet ports for the fluid which operates the rotors. At certain times during the cycle one rotor exerts most of the rotative effort, at other times the other rotor exerts most of the effort, and at intermediate portions of the cycle both rotors work together to provide the motor action. At all times the clearance between contacting face portions of the rotors is held to a minimum by accurate construction thereof, so that there will be as little free bypassing of fluid as possible. Since one cycle of rotor operation is only completed on passage of a certain volume of fluid it therefore follows that rotor speed will vary directly with variations in the volume passing through the motor.

The upper pivot portion 6" of the rotor 6 has pinned thereto a gear hub 11' of a gear wheel 11, the latter serving to drive a smaller gear 12 pinned to the indicator drive shaft 13. The drive shaft is thus driven at a speed proportional to the volume of fluid passing through the motor A. The indicator assembly B comprises a housing 9 having connecting chambers of different diameter. The lower chamber of larger diameter houses a drag cup assembly including a cylindrical case 14 having its lower open side closed by a plate 15. A drag cup shield 16 is provided having a marginal flange 16' between the lower edge of case 14 and the plate 15. To hold this assembly together and also hold it within the lower chamber of housing 9, a plurality of screws 17 (only one being shown) are extended through the plate 15, marginal flange 16', case 14 and into the housing 9 threaded to receive these screws. In the space afforded below the shield 16 there is rotatably mounted on the upper end of drive shaft 13 a cylindrical Alnico magnet 18 magnetized in a bi-polar pattern. The shaft 13 is journaled in antifriction bearings carried in openings in the case plate 3 and drag cup assembly plate 15. In the space between the shield 16 and the cylindrical case 14 there is a metallic drag cup 19 rotatably mounted by means of the Magnesyn rotor shaft 20. The shaft 20 is journaled near its lower end in a bearing 21 carried in the upper wall of case 14 and also in a bearing 21' located at the upper end of the shaft. The drag cup 19 is secured to the shaft 20 by a force fit thereover, and at the upper end the shaft has secured thereto the Magnesyn rotor 22 which forms the rotating element of a Magnesyn transmitter. Also secured on the shaft 20 is a hairspring 23 preferably made of a special grade of spring copper ribbon, chosen for its relatively low degree of stiffness. The outer end of the hairspring 23 is fastened to a pin 24 carried in the upper wall of the case 14. Thus the hairspring is normally untensioned but resists displacement of the shaft 20 from the neutral position. The permanent magnet 18 being rotated by the action of fluid passing through the motor A, the magnet rotation causes induced currents to flow in the drag cup 19. The magnetic field set up by these induced currents tends to follow the rotating field set up by magnet 18 in an effort to avoid cutting lines of magnetic flux. Thus the drag cup is caused to turn from the position of neutral spring tension and the degree of displacement is proportional to the amount of torque due to the action of rotating magnet 18. More specifically the amount of torque is directly proportional to the angular velocity of magnet 18. In order to provide induced currents in the drag cup of maximum value, the cup should be made of metal having low electrical resistance as for example copper or aluminum. The outer cylindrical wall of the cup in particular should be of a material having low electrical resistance, since most of the induced currents flow in this portion. For this reason the cup may have a copper ring or cylinder shrunk on the outer wall, as is shown and described in connection with the form of indicator of Fig. 5. The case 14 is best made of a magnetic material having a high degree of permeability, in order to provide a flux path for the permanent magnet 18 and also to shield the magnet 18, thus avoiding any adverse influence on the Magnesyn rotor 22.

The drag cup shield 16 is made of a non-magnetic material but may be of metal if desired. In the construction shown in Fig. 1, as well as in all other forms of the invention, the fluid which passes through the motor unit is free to find its way into the indicator unit housing by way of bearings and other channels and will therefore fill all empty spaces within the drag cup assembly and also around the Magnesyn rotor 22. Thus the magnet 18 and the drag cup 19 will operate while immersed in fluid. If the drag cup shield were not interposed between the magnet and drag cup there would be variable viscosity drag on the cup due to the rotating magnet. While this drag would tend to increase in direct proportion to the speed of the magnet, it would be subject to variations caused by temperature changes, changes in density of fluid and air entrapped in the fluid. Therefore in an effort to make the viscosity drag on the drag cup constant, the drag cup shield is used to isolate the cup from the rotating magnet. While the drag cup must rotate in a fluid the viscosity drag will merely exert a constant damping effect on swinging movements of the drag cup.

The Magnesyn rotor 22 forms one element of the Magnesyn transmitter which will now be described. Referring to Fig. 1 it is first noted that the indicator housing 9 having upper and lower concentric chambers is made of non-magnetic material such as aluminum. The Magnesyn rotor 22 located in the upper housing chamber is a circular permanent magnet of Alnico having a bi-polar magnetic pattern. The upper end of the housing 9 is provided with a threaded aperture 25 within which are threaded the shaft bearing 21', lock screw 26 and cap screw 27. The screw 26 is tightened against the upper end of bearing 21' after proper endwise adjustment of the bearing has been made. The screw 27 closes the aperture 25 to keep out dust and prevent escape of any fluid which might leak past the bearing 21' and lock screw 26. Around the upper end of the housing and entirely outside the wall thereof is a Magnesyn field assembly 28, comprising two laminated rings 29 and 29' of magnetic material having a high permeability, field windings 30 and a plurality of evenly spaced skeleton members or ribs 31 of insulating material. The ribs which may vary in number according to the size of the Magnesyn unit are cut from sheet fiber or other insulating material and are cut to an outline as shown. The inner laminated ring or core 29' is gripped tightly within a cut-out portion of the ribs, while the outer laminated ring 29 is supported on a shoulder portion 31' of the ribs 31. The lower edges of the ribs rest on top of the housing 9, for support of the field assembly 28. The spaces on core 29' between the ribs are wound with insulated copper wire to form the field windings described more in detail below. Four field connections are made by bringing the required winding leads up to the apertured upper ends of four of the ribs 31 and securing the leads by threading several turns of wire through the apertures, thus providing sufficient metal to make a soldered joint between the leads and connectors leading to the outside of the indicator unit B.

The upper end of the housing 9 is threaded on its exterior surface and has mounted thereover in series a field retaining ring 32, a washer 33, a nut 34, a dust cover 35, a washer 36 and another nut 37. The dust cover has mounted in its cylindrical wall portion a standard four-prong socket 38. Any of the usual and well-known mounting means may be provided to retain the socket 38 in place as shown. The four field winding connections are made by means of flexible connectors soldered to the field winding leads and to the socket prongs 39. From the above description and from inspection of Fig. 1 it will be obvious that although the fluid may enter the indicator housing and flow around the Magnesyn rotor 22, it can not contact the Magnesyn field assembly nor in any manner escape from the housing 9. This feature is important where the fluid under consideration is a combustible liquid such as gasoline, or a liquid having poor electrical insulating qualities such as water or an aqueous solution.

The magnesyn transmitter comprising rotor 22 and field assembly 28 forms half of the Magnesyn system shown diagrammatically in Fig. 2. The system consists of a transmitter comprising the magnetized rotor 22 and field 28, and a receiver comprising the magnetized rotor 40 and field 41. The rotor 40 which is an Alnico permanent magnet having a bi-polar magnetic pattern as indicated, is directly coupled to an indicator needle 42 moving over a dial 43. The fields 28 and 41 are provided with circular laminations of Mumetal forming a closed magnetic core over which several layers of insulated wire are wound. The term Mumetal designates a well-known magnetic material of high permeability having iron, nickel and cobalt as the main constituents. A similar alloy known as Permalloy may also be used. The field windings of toroidal form are interconnected by conductors 44, 45, 46 and 47 as shown in Fig. 2, so that the Magnesyn receiver may thus be located at some distance from the Magnesyn transmitter. The alternating current supply leads 44 and 45 connect with adjacent ends of the toroidal windings of the Magnesyn fields 28 and 41, while the other leads 46 and 47 connect with taps taken at 120 degree intervals around the windings. This arrangement of transmitter and receiver when properly excited by alternating current, provides, a position indicating system whereby the receiver magnet 40 and needle 42 connected thereto will be displaced in the same direction and to the same degree as the transmitter magnet 22. The complete theory of operation of the Magnesyn system is not within the scope of the present description, since this is a well-known type of self-synchronous remote indicating system. Instead of using electrically connected wound rotors as in the older selsyn system, the Magnesyn system employs bi-polar permanent magnets for the transmitter and receiver rotors. In the Magnesyn system the transmitter rotor 22 when in the neutral position (Fig. 2) induces equal second harmonic voltages in the three sections of the transmitter field 28. These equal voltages also appear in the three sections of the receiver field 41 and as a result the receiver rotor remains in the neutral or zero position as shown. If the transmitter rotor 22 is displaced through an angle in the direction of the arrow there will be unequal second harmonic voltages set up in the three sections of the field windings of both the transmitter and receiver. As a result there will be second harmonic currents circulating in the field windings which will cause a rotation of the magnetic field set up by the receiver field 41 and a displacement of the receiver rotor an amount exactly equal to the displacement of the transmitter rotor. Also if the displacing force on the transmitter rotor is removed it has a tendency to return to the neutral position, so that there will be no circulating second harmonic currents in the field windings. However in the present indicator the hairspring 23 is effective to return the transmitter rotor to the neutral position when the torque exerted by the drag cup 19 is reduced to zero. While it is not shown in the drawing it is usually desirable to mount stop pins on the upper side of the drag cup and on the lower side of the upper wall of case 14 which will be in abutment in the neutral position of transmitter rotor 22 and which will also act to stop the drag cup before it can complete a full revolution. This stop action which is a protection for the hairspring 23 is effective after about 355 degrees of cup rotation. However the dial 43 of the Magnesyn receiver, or indicating instrument, is usually graduated to cover less than a full revolution, and the units indicated thereon may be gallons per minute or any other suitable measure of fluid flow rate.

While it is noted that the Magnesyn transmitter rotor 22 and field 28 are separated by a wall of aluminum or other non-magnetic material, this does not interfere with the action of the rotor in causing second harmonic voltage to be induced in the field windings, since the lines of magnetic flux pass freely through the non-magnetic wall of housing 9. The disk-like permanent magnets forming rotors 22 and 40 are made of Alnico, which is an alloy composed of aluminum, nickel, cobalt and iron having a high coercive force and a high degree of retentivity when properly magnetized. Even though these magnets are circular in plan, as shown in Fig. 2, they are capable of taking a polarized magnetic pattern by the use of a magnetizing device having pole pieces which are adapted to contact the circular rotors 22 and 40 on their peripheries at diametrically opposite points. The rotors 22 and 40 provide the equivalent of bar magnets having north (N) and south (S) poles, as indicated by the dotted lines in Fig. 2. The orientation of the poles with respect to the field windings in the neutral positions of the rotors is as shown in Fig. 2. In this relative position the second harmonic voltages induced in the three sections of the field windings are equal, and there will thus be no circulating second harmonic currents in the windings to cause displacement of the receiver rotor 40 from the neutral or zero position.

The second form of the present fluid rate of flow indicator as illustrated in Figs. 3 and 4 includes a positive displacement fluid motor A' and an indicator unit B' secured directly on the motor. The complete indicator also includes an indicating instrument in the form of a Magnesyn receiver located at a remote point, and electrically connected as shown in Fig. 2 with the Magnesyn transmitter forming part of the indicator unit B'. The indicator unit includes also a volume totalizing switch S, adapted to operate a counter device through a suitable electric circuit not shown in the drawings.

The fluid driven motor A' in the present form of the invention is not shown completely since it is of a well-known type using an eccentric piston. It is variously known as the Neptune motor, the Kent motor or the Klein motor. By the latter name it is identified in Example 2036, page 237, of "The Engineer's Sketch Book" (seventh edition, 1940) by Thomas Walter Barber. The motor includes an outer casing 50 having a cylindrical wall and an inner boss 51 to provide an annular space in which an eccentric piston 52 operates. The piston is in the form of an inverted cup, the top wall of which rides on the upper surface of the boss 51. The piston is retained in place over the boss by a circular cover plate 53 having a central aperture through which the motion transmitting pin 54 extends. The lower end portion of the pin 54 carries an antifriction sleeve or roller 55 freely rotatable on the pin and riding in a circular track or guide slot 56, concentric with respect to the boss 51. Thus the pin 54 is constrained to follow a circular course about the center of the boss 51 and outer casing 50. Since the pin 54 projects upwardly through the top wall of the eccentric piston 52 at the central axis thereof, it is obvious that the piston will have a rotary or oscillatory motion within the casing 50, with the central axis of the piston always offset with respect to the central axis of the casing. This motion is brought about by the flow of fluid through the motor, the fluid entering and leaving through ports in the bottom wall of the motor casing. The eccentric piston 52 is prevented from turning on its own axis by means of a fixed vane secured both to the boss 51 and to the wall of casing 50. The piston 52 is provided with a slot cut through the cylindrical wall and into the top wall of the piston, and this slot receives the vane fixed in the casing. The inlet and outlet ports for the fluid are located in the bottom wall of the casing on opposite sides respectively of the vane. As the piston 52 oscillates around in the casing 50 the outer face of the piston is always in contact at one point with the cylindrical casing wall, while the inner face of the piston is always in contact at a diametrically opposite point with the circular boss 51. This structure is commonly used in water meters and has the advantages of being simple in construction, accurate and quiet in operation. Since this motor is of the positive displacement type, the motion transmitting pin 54 will follow a circular path at an angular velocity directly proportional to the volume of fluid passing through the motor A' in a given time.

The motor A' is retained within an outer ring 57, which is welded to the motor casing 50. Mounted directly over the ring 57 and over the motor A' is the indicator unit B' comprising a housing 58 having screw receiving lugs 59 thereon. These lugs (only one of which is shown) are provided with screws 60 which are threaded into suitable apertures in the ring 57. A gasket 61 is provided between the motor A' and the indicator unit B' to prevent fluid leakage. Mounted near the lower edge of the housing 58 is a bearing plate 62, secured in place within the housing by means of screws 63 (only one being shown) which are threaded into lugs 64 formed on the inner side wall of the housing. Between the upper wall 58' of the housing 58 and the bearing plate 62 there are mounted two gear trains, one for actuating the volume totalizing switch and the other for driving the rate of flow indicator mechanism.

Journaled in the plate 62 and the housing wall 58' is a shaft 65 having an arm 66 secured on its lower end. The arm 66 has a forked end which fits around the motion transmitting pin 54 at the upper end thereof, so that the arm is rotated along with the shaft 65 as the pin 54 follows a circular path conforming to the guide slot 56. The shaft 65 has fixed thereon a spur gear 67 which meshes with a gear wheel 68 mounted on shaft 69. Integrally connected to the gear wheel 68 is a spur gear 70 which meshes with a gear wheel 71 mounted on shaft 72 and integrally connected to a spur gear 73. The gear train 67, 68, 70, 71 is common to the two gear trains referred to above, and the train which drives the volume totalizing device will be described first. The spur gear 73 meshes with a gear wheel 74 which is integrally connected to a gear 75 and turns freely on shaft 69. The gear 75 meshes with a gear 76 which is integrally connected to a spur gear 77 and turns freely on shaft 65. The spur gear 77 drives the gear wheel 78 turning freely on the shaft 79 and carrying the permanent magnet 80.

The permanent magnet 80, which is carried on the gear wheel 78, is driven at a rate proportional to the volume of fluid passing through the fluid driven motor A' in a given time period. As may be seen by a comparison of diameters of driving and driven gears, the gear train involving gears 67, 68, 70, 71, 73, 74, 75, 76, 77 and 78 is arranged to give a fairly large reduction in shaft speed from the fluid motor to the rotating magnet 80. In a model of the indicator constructed for use on the well-known P-80 jet-propelled airplane, the motor driven shaft 65 rotates at a speed of forty-two revolutions per gallon of liquid fuel, while the magnet 80 is driven at a rate of one-half revolution per gallon of fuel flow. Thus the gear train to the magnet 80 is approximately an 84 to 1 ratio reduction gearing, in the particular example outlined. The magnet 80 is of the bi-polar type, which may be in the form of a permanently magnetized bar or a solid disk of Alnico magnetized in a bi-polar pattern. Threaded into the wall 58' of the housing 58 are two soft iron pole pieces 81 located on opposite sides of the shaft 79. The pole pieces are circular in cross section, except that they have a corner milled off where they project above the wall 58' to provide flat vertical faces against which the ends of a pivoted armature 82 may abut in the position as shown in Figs. 3 and 4. The upper ends of the pole pieces are connected by a bar 83 held in place by screws or other securing means. The pivot 84, which serves to mount the armature 82 for free swinging movement, is secured at its ends in the bar 83 and in the wall 58'. The pivoted armature 82 is attracted to the pole pieces 81 each time the two poles of magnet 80 come into adjacent relation with respect to the pole pieces 81, the armature thus assuming the position of Figs. 3 and 4 wherein a magnetic flux path is completed from the poles of magnet 80 through pole pieces 81 and armature 82. For each revolution of magnet 80, the armature 82 closes against the pole pieces 81 twice. While the magnet 80 must be polarized to become a permanent magnet, the pole pieces 81 and armature 82 do not have any polar relation nor do they become permanently magnetized, since they are made of untempered iron or steel having negligible magnetic retentivity.

The volume totalizing switch armature 82 has riveted thereto an angle member 82' which projects from the armature to intermittently contact a switch arm 85 made of spring brass and adapted to make connection with another switch arm 86 also of spring brass or other metal. The arms 85 and 86 are mounted in a block of insulating material 87 secured on the wall 58' of housing 58. The tail ends of arms 85 and 86 provide soldering lugs for switch leads 85' and 86' which connect to a counter operating circuit (not shown). The numbers which register on the counter are adapted to show the total volume passing through the fluid motor A'. The advantage of the magnetically operated totalizing switch is that there need be no shafts or other movable elements extending through the indicator housing which might permit the escape of combustible fuel, or other fluid. It might be noted that the switch arm 85 is bent slightly each time it is contacted by the angle member 82' in order that the two normally separated switch arms may engage to close the switch. Since the arm 85 is then under stress it is capable of moving the ends of armature 82 away from the pole pieces 81 when the magnet 80 moves away from the pole pieces and the latter lose their magnetic effect. Thus as the switch arms separate again the ends of armature 82 are moved away a short distance from the flat face portions of the pole pieces 81. The switch arms are equipped with silver contacts as shown (Fig. 4), and it is also desirable to connect a small condenser across the switch arms to keep sparking at the contacts down to a minimum.

The second gear train beginning with the gears 67, 68, 70 and 71 is for driving the permanent magnet of the fluid rate of flow indicator. The remainder of this second gear train will now be described. The gear wheel 71 previously described is constantly in mesh with a spur gear 90 having a hub which runs freely on a shaft 91 and also extends within the hub of a gear 92. The interfitting hubs of the gears 90 and 92 are surrounded by a coil spring 93 having one end secured to the gear 90 and the other end secured to the gear 92. The interfitting hubs of the gears may rotate relative to each other but such rotation is limited by the spring 93, so that there is provided a certain resilience in the drive which tends to minimize the effect of sudden speed changes. This resilience not only affords shock protection for the gearing but also helps to avoid sudden variations in the rate of flow indication on the Magnesyn receiver, or indicating instrument. The gear 92 meshes with a pinion 94 fixed on the shaft 95. The gear wheel 96 also fixed on the shaft 95 meshes with a pinion 97 secured on the shaft 98. This second gear train starting at pinion gear 67 and ending at pinion gear 97 has one portion including gears 67, 68, 70 and 71 which reduce speed and another portion including gears 71, 90, 92, 94, 96 and 97 which increase speed. Thus the net effect is that the shaft 98 connected to the indicator mechanism is driven faster than the pinion gear 67 which is driven by the shaft 65. The net increase is merely that afforded by increase of shaft speed due to gears 92, 94, 96 and 97 minus the decrease of shaft speed due to gears 67 and 68, since the increase due to driven pinion gear 90 will be canceled by the decrease due to driving pinion gear 70, assuming of course that the two pinion gears each have the same number of teeth.

Carried within an opening formed in the housing 58 is a drag cup assembly including a cylindrical case 100 closed at its lower end by a cover plate 101 held in place by screws which extend through the cylindrical wall of case 100 and thread into the housing 58. Fixed within the case 100 is a drag cup shield 102 having a marginal flange clamped securely between the case 100 and the cover plate 101. Rotatably mounted on the shaft 98 within the drag cup shield 102 is an Alnico permanent magnet 103. The magnet rotates with the shaft 98 and this shaft, as well as the shaft 95, is mounted in antifriction bearings carried in the bearing plate 62 and in the cover plate 101. The drag cup shield 102 is formed with a central depression within which is mounted a bearing member 104 supporting the lower end of a shaft 105 non-rotatably secured to the drag cup 106. The housing 58 is provided with a shouldered aperture to receive a housing extension 107 having a portion at the upper face of housing 58 spun or hammered into a recess to retain the housing extension securely in place. The drag cup shaft 105 extends upwardly within the housing extension 107 to a bearing 108, and also has mounted thereon a Magnesyn transmitter rotor 109. The bearings 104 and 108 are preferably jewel bearings similar to those used in watches and instruments. The drag cup 106, shaft 105 and rotor 109 are yieldably retained in a neutral or zero position by means of a hairspring 110 having its inner end secured to the hub portion of the drag cup and its outer end secured to a pin on the case 100. It is to be understood that the drag cup shield 102 is made of any suitable non-magnetic material, while the drag cup 106 is of necessity metallic and should be made of a metal having low electrical resistance. The drag cup is preferably made of aluminum and may have a copper ring or sleeve shrunk on its outer wall, since this is the portion of the cup where the effective induced currents flow. The manner in which the cup is displaced from neutral position by the action of the rotating magnet has been explained in some detail previously. The torque developed in the cup 106 and shaft 105 is resisted by the hairspring 110 with the result that for any certain speed of the magnet the cup will be displaced only a certain amount depending on the counter-torque exerted by the hairspring. Thus the hairspring must be carefully selected to exert a counter-torque within the proper range, to allow the drag cup only limited angular movements. The drag cup preferably is equipped with stop means to limit its rotation to approximately one full turn away from neutral position. The marginal flange on the drag cup shield 102 is radially slotted, as at 102', to provide for passage of fluid into the case 100 and housing extension 107.

Fitting around the housing extension 107 and resting on the upper face of housing 58 is a Magnesyn transmitter field assembly 111 exactly similar in construction to the field assembly 28 of Fig. 1 and held in place by a flanged ring 112. The ring 112 fits over a threaded post 113 at the upper end of the housing extension 107, and is held tightly in place against the field assembly by means of a nut member 114. Over the Magnesyn transmitter there is secured a cover or cap 115 having an outlet for the four leads 116 from the Magnesyn transmitter field. An additional circular cover member 117 is provided to completely cover the Magnesyn unit and the totalizing switch S. The cover 117 also carries a six-prong socket 118 (Fig. 4), which makes connection to the switch leads 85' and 86' and to the four field leads 116 and provides convenient means to connect with the Magnesyn receiver located at a remote point, such as on the instrument panel of an aircraft. The covers 115 and 117 are held in place by small screws (not shown). It is further noted that the housing 58 in Fig. 3 has been lengthened to some extent to show the gear trains more clearly. Actually the successive shafts of the gear trains are in staggered relation, so that the gearing will be in a more compact relation within the circular housing 58.

The indicator assembly as described is complete except for the Magnesyn receiver or indicating instrument which will be exactly like the unit C described in connection with Figs. 1 and 2. The field connections will also be like those of Fig. 2 and in every important respect these Magnesyn devices will be the same in all forms of the invention. The principles of operation are also similar in each case, that is a shielded drag cup is displaced from a neutral position by means of a rotary magnet turning at a rate proportional to the volume of fluid passing through a fluid flow motor in a given time. The drag cup being directly coupled to a Magnesyn transmitter rotor, a signal is produced in the transmitter field windings which is conducted to the field windings of a Magnesyn receiver. The receiver is equipped with a rotor which follows the movements of the transmitter rotor and is directly coupled to an indicating needle. The indicating needle moves over a dial calibrated to read in appropriate units of flow rate, such as gallons per minute. In the first two forms of the invention (Figs. 1 to 4) the rotary magnet which effects displacement of the drag cup is driven by means of a positive displacement fluid flow motor, and therefore the indicator so equipped will be quite accurate as long as the normal maximum capacity of the motor is not exceeded. The only chance for error is in fluid leakage or slip through the motor and this is a more or less constant factor in a positive displacement fluid motor. In the indicator of Figs. 3 and 4 the spring connection between gears 90 and 92 provides a simple means to absorb sudden variations in fluid flow and also absorb slight variations due to inequalities of driving effort during a single cycle of the eccentric piston 52. As in the first form of the invention, the fluid flowing through the motor A' may fill the space within the indicator housing 58 and also by way of the bearings may fill the spaces around the drag cup as well as the interior of the housing extension 107. The purpose of the drag cup shield in preventing a variable viscosity drag on the drag cup has already been explained in some detail in connection with the foregoing description of Fig. 1.

In the third form of the invention as shown in Fig. 5 the fuel or other fluid supply tank is connected to the tubular fitting 120 so that the fuel will flow through the fitting in the direction of the arrows, past the indicator structure retained within the enlarged tubular section 121 and thence outward through the tubular fitting 122 on its way to the engine or other fluid consuming device. The fittings 120 and 122 are flanged as at 123 and 124 to receive machine screws 125 which thread into flanges 126 and 126' on the opposite ends respectively of the tubular section 121. Between the confronting faces of the adjacent flanges there are sealing gaskets 127 to prevent fluid leakage.

Secured within the enlarged tubular section 121 is the indicator unit B" comprising a housing 128 covered at the respective ends by means of housing cover or extension members 129 and 130 having reduced screw-threaded portions extending within the housing 128 and threaded thereinto. While the major portion of the housing 128 has a diameter less than the inside diameter of the tubular section 121 to allow free passage of fluid around the housing, the latter includes two supporting fins or projections 128' and 128" which contact the inside surface of section 121. The housing 128 may be secured in the position shown within section 121 in any suitable manner, but it is preferred to weld the housing in place by first providing an opening in the wall of tubular section 121 as indicated at 121' and then making a fillet weld between the fin 128' and the section 121. The resulting annular weld 131 provides an integral connection and also builds up a ring of material which may be machined to a smooth finish on the inside to receive a tapered projecting portion on a special four-prong socket 164 to be described below. While the supporting fin 128' on the housing 128 should be at least as thick as the diameter of the aperture 121', the other fin 128" may be quite thin since it serves merely to support the housing 128 in correct position while the weld 131 is being made. The supporting fins 128' and 128" should have a streamline shape in longitudinal cross section to reduce fluid turbulence to a minimum. The fluid driven motor A" in the present example is in the form of a rotary impeller 140 having two helical vanes 141 thereon. The pitch and number of vanes may be varied according to the density of the fluid and velocity of flow, but in the present case where the fluid happens to be a liquid hydrocarbon such as gasoline or kerosene very satisfactory results are obtained with a two-vane impeller in which there are four threads per inch. Thus each vane completes a full revolution in an axial distance of one-half inch. By reaction between the impeller vanes and the forwardly moving fluid, the rotation of the impeller will be in a clockwise direction looking into the outlet end of the indicator assembly. The rate of impeller rotation will be directly proportional to the rate of fluid flow, although the accuracy of this proportional relation will diminish somewhat at high rates of flow because of increased turbulence in the fluid. To keep turbulence at a minimum the housing elements and the impeller have been shaped to avoid sharp turns, recesses and projections insofar as possible.

The impeller 140 has its hub bored and counterbored to receive the impeller shaft 142 and the impeller retaining member 143 which is threaded over the shaft 142. The member 143 has its outer end smoothly tapered to assist the streamline flow of fluid and thus reduce turbulence. To prevent relative rotation between the shaft and impeller a key 144 is provided which seats in keyways in the two elements. The shaft 142 carries an integral shoulder portion 145 and between this shoulder portion and the impeller 140 there is clamped the inner race of a ball bearing assembly 146 supported in the end wall of the housing extension 130. The impeller shaft 142 extends inwardly of the indicator assembly for direct connection with the rotary magnet which effects the drag cup movements.

The housing 128 is provided with a circular recess within which is mounted the drag cup assembly comprising the cylindrical case 147, the flanged drag cup shield 148 and the cover plate 149 for the case. These three elements are held in position as shown by a ring 150 which threads into the housing. At the center of the cover plate 149 there is mounted a ball bearing assembly 151 having the inner race thereof clamped between a shoulder on shaft 142 and the hub portion of permanent magnet 152. This hub portion is secured on the free end of shaft 142 by means of interfitting screw threads as indicated in Fig. 5. Rotatably mounted around the non-magnetic drag cup shield 148 is the metallic drag cup 153, which as shown in Fig. 5 is provided with an outer ring or band of copper shrunk over an aluminum cup. The drag cup 153 is fixed on one end of the drag cup shaft 154, this shaft being in coaxial relation with respect to the impeller shaft 142. The drag cup shaft 154 is journaled in one bearing in the end wall of cylindrical case 147 and in another bearing fixed in the end wall of a recess 155 within an inner extension of the housing 128. Mounted on the shaft 154 within the recess 155 is a Magnesyn transmitter rotor 156, which is a permanently magnetized disk of Alnico, as previously described. The drag cup 153, shaft 154 and rotor 156 turn together as a unit and are yieldably retained in a neutral or zero position by means of a hairspring 157, having one end secured to the shaft 154 and the other or outer end secured to a pin on the drag cup case 147. The marginal flange on the drag cup shield 148 is radially slotted, as at 148', to provide for passage of fluid into the case 147 and also into the rotor recess 155.

Since the various shaft bearings from the impeller inwardly to the rotor recess 155 will readily allow the passage of fluid in small quantities it is obvious that the fluid passing through the indicator will fill the spaces within the housing 128 from the impeller shaft bearing 146 rearwardly to the end wall of recess 155. Thus, as in the other forms of indicator described above, the drag cup shield will have its intended purpose of preventing a variable viscosity drag on the drag cup. The fluid being around the drag cup, there will be a slight damping effect exerted on the drag cup but the only force tending to move the cup will be that due to the rotating magnetic field set up by the permanent magnet 152. The drag cup, and more particularly the outer band thereon, cuts the lines of magnetic flux caused by the rotating magnet and thus tends to follow the rotating field in a manner similar to the action of the rotor of an induction motor. This tendency of the drag cup to turn is resisted by the hairspring 157, so that the drag cup takes a position of equilibrium where the torque exerted by the action of the magnetic field is equal to the counter-torque exerted by the hairspring. Subsequent increase or decrease in the speed of magnet 152 will increase or decrease the torque exerted thereby on the drag cup, and the cup will thus move to a new position where the torque forces are in balance. In order to further assist the movement of fluid into the housing 128 there are provided small caliber passages 158 through the wall of the housing into the interior thereof. This construction prevents the pocketing of air or vapor within the housing in the spaces which are normally to be filled with engine fuel or other liquid. The presence of air within the drag cup case 147 and within the rotor recess 155 would alter the damping effect of the fluid on the drag cup 153 and Magnesyn rotor 156. It might also affect the normal viscosity drag on the rotating magnet 152 to produce inaccurate results. The fluid may be a liquid hydrocarbon which will serve as an efficient lubricant for the shaft bearings, but in any case there will be very little friction developed if the bearings are properly installed.

The inner extension of the housing 128 which extends within the housing cover or extension member 129 carries the Magnesyn transmitter field assembly 160, which of course is inaccessible to the fluid passing through the indicator assembly. The field assembly 160 is held in place by a flanged retaining ring 161 similar to the ring 32 of Fig. 1, a sleeve 162 and a washer 163 assembled in succession as shown and held in assembled relation by means of a central screw (not shown) passing through the washer 163 and threaded into the inner extension of the housing 128. The four leads from the Magnesyn transmitter field 160 extend outwardly through an opening in the housing fin 128' and thence into a four-prong socket 164. The socket is of the elbow type and has an inner face portion which fits closely around a portion of the tubular section 121. Attached to the socket 164 is a clamping band 165 which holds the socket tightly against the tubular section 121, with a conical or tapered portion 164' of the socket extending within the wall of the tubular section 121 adjacent to the annular weld 131, to accurately position the socket and prevent movement thereof which might damage the Magnesyn field leads.

The rate of fluid flow indicator as described must also include the indicating instrument, which is in the form of a Magnesyn receiver connected to the Magnesyn transmitter in the manner previously described in connection with Fig. 2. The Magnesyn system, as shown diagrammatically in Fig. 2, is in the nature of a position indicating device since it shows the instant position as well as the amount of angular displacement of drag cup which is coupled to the Magnesyn transmitter rotor. It should be clear that other forms of position indicating means, either electrical or mechanical, may be used if desired.

However for its inherent compactness, reliability and simplicity the Magnesyn system has been chosen for use in the specific embodiments of the invention disclosed herein.

Summarizing the operation of the rate of fluid flow indicator, it is to be noted that the essential features of the indicator are substantially identical in all three embodiments thereof. A fluid driven motor is coupled to a rotating magnet to provide means effective in applying a torque to a drag cup surrounding the magnet. Since the rate of fluid flow through the motor determines the speed thereof, this rate will also determine the speed of the rotating magnet and the amount of torque on the drag cup. The drag cup movement or displacement about its axis of rotation being resisted by a light spring, the degree of displacement from a zero position will be determined by the amount of torque force applied to the drag cup by means of the rotating magnet. The drag cup being separated from the rotating magnet by a stationary shield any viscosity drag or damping effect on the drag cup due to the presence of fluid will be constant. The degree of displacement of the drag cup from the zero position is indicated by a position indicating device, such as a Magnesyn system having the rotor of the Magnesyn transmitter directly connected to the drag cup and contained within the same housing therewith. The main structural elements of the indicator are preferably made of a non-magnetic material, such as aluminum, magnesium or brass. However in each form of the indicator the drag cup case, such as 14 in Fig. 1, 100 in Fig. 3 and 147 in Fig. 5, should be of a magnetic material having high magnetic permeability and low magnetic retentivity. The purpose of using such a material for the case is to provide a flux path for the rotary magnet mounted therein and to shield the magnet and prevent adverse effects on the Magnesyn rotor. Where magnetic materials are required they should be similar to those identified and described in the foregoing description. It is further noted that the presence of fluid around the drag cup and Magnesyn transmitter rotor is an advantage, in that the resulting damping effect on movements of these elements effectively eliminates sudden fluctuations in the rate of flow readings on the indicating instrument. With a fluid such as kerosene or fuel oil this damping effect is quite marked and a relatively stable instrument is the result.

In all forms of the invention as illustrated in the drawings the metallic rotor or armature which is displaced from the zero position by a rotating magnet to give an indication of the relative speed of the magnet, is in the form of a cup-shaped element identified as a drag cup. This rotor may take various circular forms and the rotating magnet may also have cross-sectional shapes different from those illustrated. The cup type of rotor as illustrated provides a drag rotor giving a maximum torque in a minimum of space, but the rotor can be in the form of a metallic disk journaled at its center or a metallic ring supported by radial arms and rotatably mounted to turn about its central axis. While a bi-polar magnet is preferred because it retains its magnetism better and is easier to make, the indicator will give satisfactory results using a rotating magnet adjacent the drag rotor having more than two poles.

The embodiments of the invention herein shown and described are to be regarded as illustrative only and it is to be understood that the invention is susceptible to variations, modifications and changes within the scope of the appended claims.

I claim:

1. A fluid rate of flow indicator comprising, a motor operated by the flow of fluid therethrough and driven at a rate of speed proportional to the volume of fluid passing therethrough in a given time period, a rotatably mounted magnet, means providing a driving connection from said motor to said magnet, a metallic rotor mounted to turn on its central axis in adjacent relation to said magnet and coaxial with respect thereto, spring means resisting rotary displacement of said rotor by the rotating magnetic field from said magnet, a relatively stationary perforate shield made of a non-magnetic material and interposed between said magnet and said rotor to prevent viscosity drag on said rotor by said rotatably mounted magnet due to fluid therebetween, means housing all of the foregoing indicator elements and being adapted to receive a portion of said fluid therein, and means to indicate the degree of displacement of said rotor by said rotating magnetic field.

2. A fluid rate of flow indicator comprising, a motor operated by the flow of fluid therethrough and driven at a rate of speed proportional to the volume of fluid passing therethrough in a given time period, a rotatably mounted magnet, means providing a driving connection from said motor to said magnet, a metallic rotor mounted to turn on its central axis in adjacet relation to said magnet and coaxial with respect thereto, spring means resisting rotary displacement of said rotor by the rotating magnetic field from said magnet, a relatively stationary shield made of a non-magnetic material and interposed between said magnet and said rotor to prevent viscosity drag on said rotor by said rotatably mounted magnet, means housing all of the foregoing indicator elements and being adapted to receive a portion of said fluid therein, and means including a self-synchronous electromagnetic system to indicate the degree of displacement of said rotor by said rotating magnetic field.

3. A fluid rate of flow indicator comprising, a motor operated by the flow of fluid therethrough and driven at a rate of speed proportional to the volume of fluid passing therethrough in a given time period, a rotatably mounted magnet, means providing a driving connection from said motor to said magnet, a metallic rotor mounted to turn on its central axis in adjacent relation to said magnet and coaxial with respect thereto, spring means resisting rotary displacement of said rotor by the rotating magnetic field from said magnet, a relatively stationary shield made of a non-magnetic material and interposed between said magnet and said rotor to prevent viscosity drag on said rotor by said rotatably mounted magnet, means housing all of the foregoing indicator elements and being adapted to receive a portion of said fluid therein, means including a self-synchronous electromagnetic system to indicate the degree of displacement of said rotor by said rotating magnetic field, said system comprising a transmitter portion and a receiver portion electrically connected together, said transmitter portion having a magnetic rotor within said housing means, and a shaft journaled in said housing means and having said metallic rotor and said magnetic rotor fixed on opposite ends thereof.

4. A fluid rate of flow indicator comprising, a motor operated by the flow of fluid therethrough and driven at a rate of speed proportional to the volume of fluid passing therethrough in a given time period, a rotatably mounted magnet, means providing a driving connection from said motor to said magnet, a metallic rotor mounted to turn on its central axis in adjacent relation to said magnet and coaxial with respect thereto, spring means resisting rotary displacement of said rotor by the rotating magnetic field from said magnet, a relatively stationary shield made of a non-magnetic material and interposed between said magnet and said rotor, a cylindrical case containing said magnet, said rotor and said shield, means providing passages to allow a portion of said fluid to enter said case and fill the spaces around and between said magnet, said rotor and said shield, and means to indicate the degree of displacement of said rotor by said rotating magnetic field.

5. A fluid rate of flow indicator comprising, a motor operated by the flow of fluid therethrough and driven at a rate of speed proportional to the volume of fluid passing therethrough in given time period, a rotatably mounted magnet, means providing a driving connection from said motor to said magnet, a metallic rotor mounted to turn on its central axis in adjacent relation to said magnet and coaxial with respect thereto, spring means resisting rotary displacement of said rotor by the rotating magnetic field from said magnet, a relatively stationary shield made of a non-magnetic material and interposed between said magnet and said rotor, means including a self-synchronous electromagnetic system to indicate the degree of displacement of said rotor by said rotating magnetic field, said system comprising a transmitter portion and a receiver portion electrically connected together, said transmitter portion having a magnetic rotor directly connected to said metallic rotor so as to turn therewith, housing means containing said magnet, said metallic rotor, said shield and said magnetic rotor, means providing passages to allow a portion of said fluid to enter said housing means and fill the spaces around and between said magnet, said metallic rotor, said shield and said magnetic rotor, and said transmitter portion having an annular field winding mounted around the outside of said housing means adjacent to said magnetic rotor.

6. A fluid rate of flow indicator comprising, a tubular conduit for said fluid, a rotary fluid-operated impeller mounted within said conduit and coaxial with respect thereto, a rotatably mounted magnet, means providing a driving connection from said impeller to said magnet, a metallic rotor mounted to turn on its central axis in adjacent relation to said magnet and coaxial with respect thereto, spring means resisting rotary displacement of said rotor by the rotating magnetic field from said magnet, a relatively stationary shield made of a non-magnetic material and interposed between said magnet and said rotor, a cylindrical case supported within said conduit and containing said magnet, said rotor and said shield, means providing passages to allow a portion of said fluid to enter said case and fill the spaces around and between said magnet, said rotor and said shield, and means to indicate the degree of displacement of said rotor by said rotating magnetic field.

7. A fluid rate of flow indicator comprising, a tubular conduit for said fluid, an indicator housing cylindrical in cross section supported within said conduit coaxially thereof and having an outside diameter less than the inside diameter of said conduit to allow the free passage of fluid therebetween, a rotary fluid-operated impeller mounted on one end of said housing by means of a central shaft rigidly connected to said impeller and extending within said housing, a magnet fixed on said shaft within said housing, a metallic rotor mounted to turn on its central axis in adjacent relation to said magnet and coaxial with respect thereto, spring means resisting rotary displacement of said rotor by the rotating magnetic field from said magnet, a relatively stationary shield made of a non-magnetic material and interposed between said magnet and said rotor, and means to indicate the degree of displacement of said rotor by said rotating magnetic field.

8. A fluid rate of flow indicator as recited in claim 7, wherein the last-mentioned means comprises a self-synchronous electromagnetic system including a transmitter portion mechanically connected to said rotor and located within said indicator housing, and a receiver portion electrically connected to said transmitter portion but located remotely with respect to said indicator housing and said tubular conduit.

JAMES C. BREWER.

REFERENCES CITED

The following references are of record in the file of this patent:

UNITED STATES PATENTS

| Number | Name | Date |
|---|---|---|
| 1,305,803 | Irwin | June 3, 1919 |
| 2,141,445 | Paul | Dec. 27, 1938 |
| 2,259,615 | Chappell et al. | Oct. 21, 1941 |

FOREIGN PATENTS

| Number | Country | Date |
|---|---|---|
| 323,198 | Great Britain | Dec. 23, 1929 |
| 625,135 | France | Apr. 19, 1927 |